United States Patent [19]

Marsh

[11] 4,044,476
[45] Aug. 30, 1977

[54] EDUCATIONAL METHODS AND DEVICES

[76] Inventor: Jeanette B. Marsh, 1400 N. Lake Shore Drive, Chicago, Ill. 60610

[21] Appl. No.: 394,509

[22] Filed: Sept. 5, 1973

[51] Int. Cl.² ..................... G09B 17/00; A63F 9/10
[52] U.S. Cl. ........................................ 35/35 J; 35/71; 273/157 R
[58] Field of Search .................. 35/35 H, 35 J, 69–72; 273/152.7 R, 152.7 A, 156, 157 R, 157 A

[56] References Cited

U.S. PATENT DOCUMENTS

| | | | |
|---|---|---|---|
| 77,268 | 12/1904 | Thompson | 35/70 |
| 3,212,201 | 10/1965 | Jensen | 35/70 X |
| 3,302,310 | 2/1967 | Leven | 35/35 H |
| 3,333,351 | 8/1967 | Williams | 35/35 J |
| D. 163,085 | 5/1951 | Bishop | 35/72 X |

FOREIGN PATENT DOCUMENTS

| | | | |
|---|---|---|---|
| 831,817 | 6/1938 | France | 35/35 J |
| 492,977 | 4/1954 | Italy | 35/35 J |
| 484,259 | 5/1938 | United Kingdom | 35/71 |
| 816,076 | 7/1959 | United Kingdom | 35/35 J |

Primary Examiner—William H. Grieb
Attorney, Agent, or Firm—Brezina & Lund

[57] ABSTRACT

Educational system for facilitating the learning through the discovery and inductive reasoning process wherein expression means as to a set of interrelated concepts are divided into first and second groups on objects which are physically manipulatable to disclose any expression of the first group into adjacent relation to any expression of the second group, to provide a number of correct examples in which the objects physically mate and a number of incorrect examples in which they are in non-mating relationship physically, with the numbers of correct and incorrect examples being such as to enable the student to learn the interrelated concepts, without pre-instruction, and solely from the discovery and inductive reasoning process during trial and error manipulation of the objects and to facilitate the development of the discovery and inductive reasoning process itself irrespective of the subject matter of the concepts. Preferably, an introductory set of objects is supplied to the student to enable him to become involved in the mating operation of the objects after which a large number of objects are supplied to enable the student to confirm and expand upon his learning of the process. Important features relate to the configuration of the objects such that they can be readily manipulated and such that the expressions thereon, rather than the physical form of the objects, quickly becomes of primary interest to the student.

10 Claims, 13 Drawing Figures

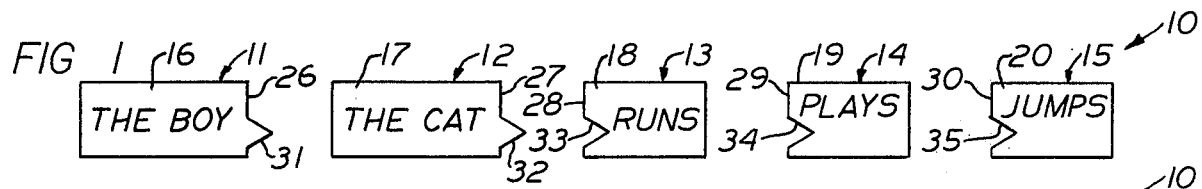
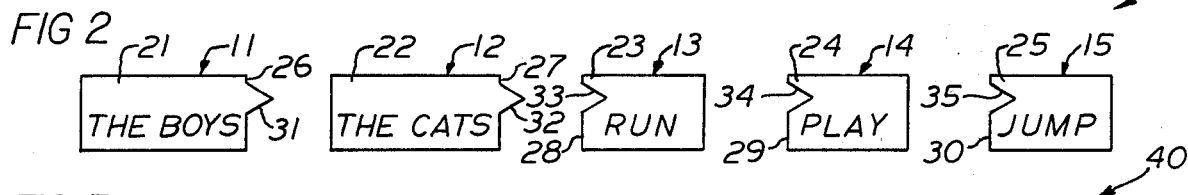
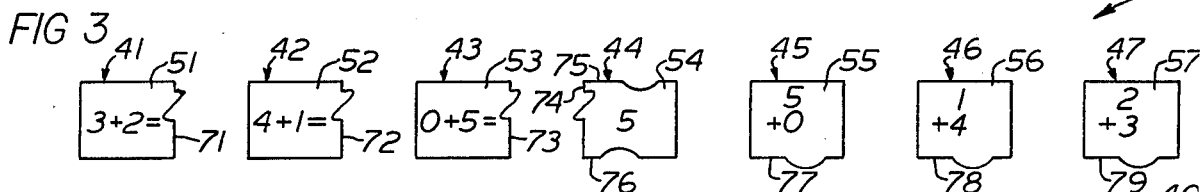
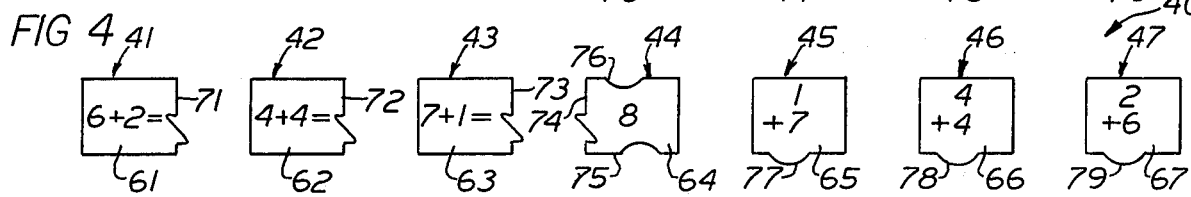
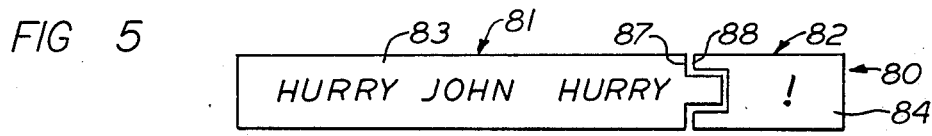
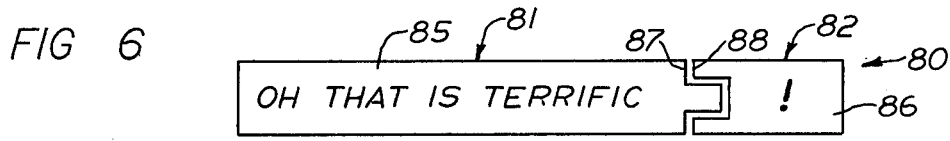
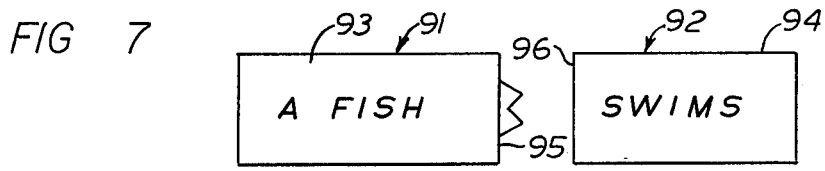
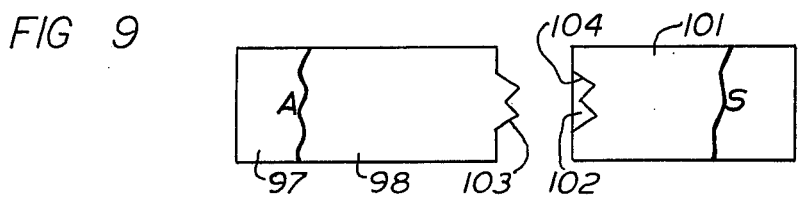

FIG 10

Row 111: Some boys | want | the large | picture .
Row 112: Four brothers | pull | the middle | scarf .
Row 113: One brother | wants | the blue | table .
Row 114: A girl | wins | the cheap | string .

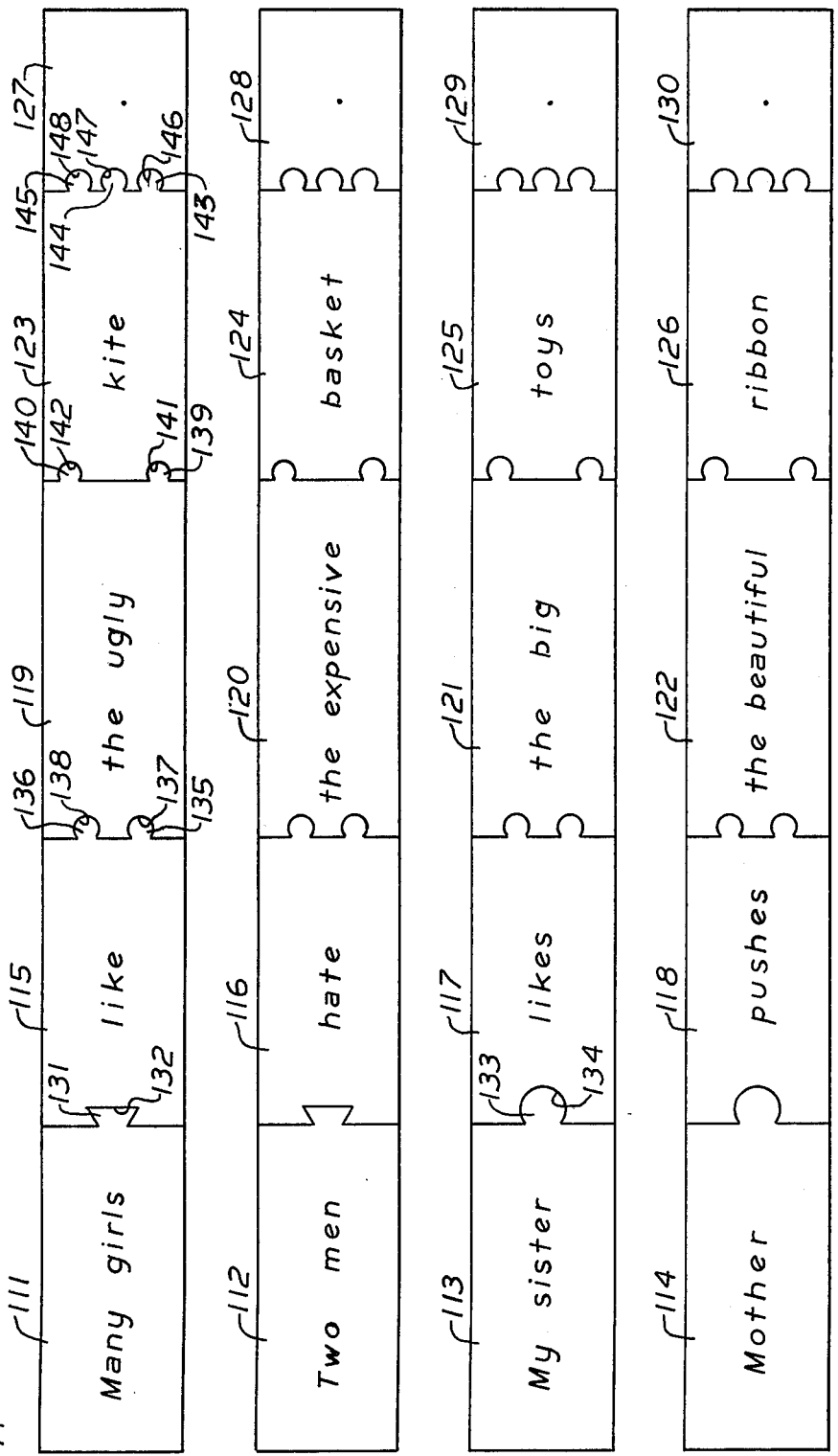
FIG 11
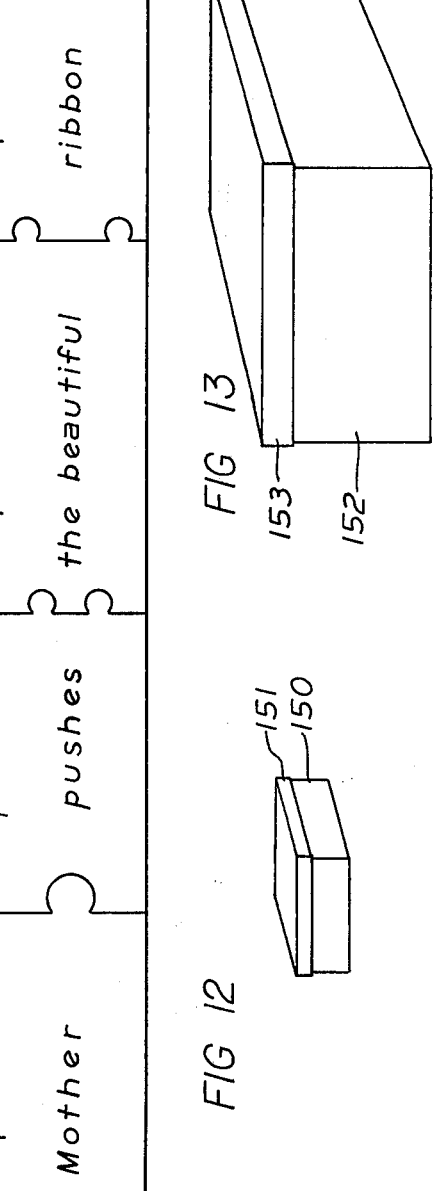
FIG 12
FIG 13

EDUCATIONAL METHODS AND DEVICES

This invention relates to an educational system and more particularly to a system in which students, especially young students, learn without pre-instruction through their discovery and inductive reasoning powers and learn the application of such powers to particular subjects, using devices which are readily and economically provided. The system rapidly develops the use of the reasoning and creative powers of the student.

This application contains subject matter also disclosed in my application Ser. No. 91.613, filed Nov. 20, 1970 and my application Ser. No. 694,939, filed Jan. 2, 1968 both of which are abandoned.

BACKGROUND OF THE PRIOR ART

Conventional teaching methods have been based upon the Thorndike theory which has much in common with the Pavlovian conditioning theory, the child being taught facts by rote with little opportunity to obtain a basic understanding of the relationship between the facts. Classrooms have been "wordy", the typical situation being that the teacher talks to the child with the child then repeating by reciting back or writing words on paper. Such methods require strict discipline and a passive role on the part of a student, discouraging individual creation and exploration. Perhaps even worse, such methods cause the child to rebel at school and at the educational process, sometimes openly, or more often in secret or in his sub-conscious. As a result, the students acquire a revulsion, continuing into adulthood, at particular subjects which they have been exposed to in school against their will. Thus many intelligent adults have an emotional block with respect to mathematics, or science, or grammar, or history. The results of such methods has been especially disastrous with children whose background is such that they are afraid to explore or venture into creative activity for fear of reprisals. On the other hand, children whose backgrounds are such that creativity and exploration have been encouraged, are usually bored by conventional teaching methods.

Another problem in connection with the conventional methods is that they require a high degree of attention on the part of the teacher in talking to the children and demonstrations to them, listening to their verbal responses and in examining and grading written responses. Maintaining discipline is also a problem which is severe in many circumstances. As a result, the teacher oftentimes becomes tired and distraught and at odds with the children, further frustrating the learning process.

Various devices have been proposed for use in schools but such devices have been merely adjuncts or extensions of the methods based upon the Thorndike or Pavlovian theories. For example, multiple-choice teaching machines have been used wherein the student selects the correct from several possible answers to a written question, his response being automatically registered. Such machines may reduce the load on the teacher with respect to grading of papers but do not solve the basic problem.

A considerable number of types of devices have also been proposed in the prior art wherein objects are physically manipulatable into mating or non-mating relationship. Such devices, however, have been such that the student, in effect, learns specific facts by rote, without any substantial use of their discovery an inductive reasoning powers and without encouraging and developing creative and reasoning powers. As a result, students quickly become bored with such devices and none of them have been used to any substantial continuing extent. An example is the device of the Williams U.S. Pat. No. 3,333,351, wherein blocks may be arranged in prescribed relationships for the purpose of teaching English sentence structure. The arrangement is such that the teacher must thoroughly explain and/or demonstrate it to the student, monitor its use and otherwise motivate the student.

SUMMARY OF THE INVENTION

My aforesaid prior applications disclose very important methods of instruction whereby a student learns interrelated concepts solely from the discovery and inductive reasoning process during trial and error tactile manipulation of expression means, to facilitate the use of the discovery and inductive reasoning powers of the student irrespective of the subject matter of the interrelated concepts. Said prior applications also disclose specific constructions of expression means which greatly facilitate practice of such methods.

Briefly, in accordance with the methods of my invention, a child is provided with a set of expression means including a multiplicity of expressions divided into first and second groups, for physical manipulation by the child to dispose any expression of the first group into adjacent relation to any expression of the second group. Each expression of the first group is combinable with a plurality of expressions of the second to form a plurality of different correct examples of similar expressions and to establish for each of the interrelated concepts a plurality of different correct examples of combination of expressions and a plurality of incorrect examples of combinations of expressions. The expression means are provided with interengagement means with physical configurations and interchangability such that a physically non-mating relationship exists when each incorrect example is established and such that a physically mating relationship exists when each correct example is established. Thus the student is rewarded and, as each new correct example is established, his confidence increases.

Although the procedure might be referred to as "trial and error" manipulation, it is found that with the systems of the inventions, errors are usually at a minimum. A very important feature is that the multiplicity of expressions on the expression means and the number of the correct and incorrect examples is sufficient to enable the student to learn the interrelated concepts solely from the discovery and inductive reasoning process during manipulation of the expression means. Thus use of the discovery and inductive reasoning process is facilitated irrespective of the subject matter of the set of interrelated concepts.

According to another feature, the student is supplied with another set of expression means of similar character for enabling the student to learn another application of the discovery and inductive reasoning process as applied to the learning of a second set of interrelated concepts. Thus the student begins to learn that the process is not limited to one subject matter but has universal application.

In accordance with specific features, the physical mating and non-mating relationships are so established as to permit quick and positive determination by the student and to cause his attention to be directed to the subject matter of the concepts and the exercise of a process, minimizing his attention to the physical form of the expression means. In particular, the expression means are adapted to be disposed in alignment and with a minimum distance between centers thereof only in the mating condition, the expression means being either misaligned or having a substantially greater distance between centers in the non-mating condition. For example, as disclosed in my prior applications, the expression means may be in the form of flat blocks of generally rectangular form adapted to be disposed in alignment by having opposite edges of one block and opposite edges of the other along parallel lines. Adjacent edges of the blocks, when so disposed, are irregular, for example, with one having at least one projection and the other having at least one recess, the projections and recesses being offset from a line midway between the aligned opposite edges of the blocks. The direction of offsets are the same when the blocks are correctly disposed so as to permit them to mate and so as to permit disposition with a minimum distance between centers of the blocks. The direction of the offsets are opposite when the blocks are incorrectly disposed so that the distance between centers of the blocks is substantially greater.

Since filing of my original application on Jan. 2, 1968, I have conducted research and experimentation with young children, verifying the accuracy and importance of my original concents and I have also developed improvements and refinements with respect to my methods and with respect to the manner of establishing the physically mating and non-mating relationships. In particular, my research and experimentation verifies that in order to insure that a child will begin to learn through the discovery and inductive reasoning approach, it is necessary to provide the child with a large number of expression means such that a large number of correct and incorrect examples can be established. The number required depends to some extent upon the intelligence of the child, his prior experience and the complexity of the concepts of the correct and incorrect examples, but generally I have found that the numbers should be such that at least 40 correct examples can be established and preferably, the number should be such that a much greater number of correct examples can be established with there being a variety of expressions such as to maintain the interest of the child and his own individual ability to grasp and confirm his individual rationale of the concepts being learned. Thus the child will repeatedly exercise the discovery and inductive reasoning process and learn by himself how to apply it, but the repetition is the practice of the process not in the repetition of identical expressions over and over again.

The child also gains in learning the subject matter of the concepts involved in the particular means in use. In this connection, it is to be emphasized that the primary purpose of the invention is to enable a child to learn through the inductive and reasoning process itself from his own experience which is extremely important in increasing his ability to learn both in school and out of school and to deal with situations he encounters in his everyday life. However, in the process, the child will learn the subject matter of the concepts set forth in the expression means and such learning is an important by-product of the method. It is also highly desirable that the child be allowed to use a number of sets of expression means with different subject matters so that he will learn from his own experience that the discovery and inductive reasoning process has universal application, as well as to provide variety and hold his interest.

My research work has included studies of the results of research work in the laboratory schools of teacher's colleges which in general suggest the following directions:

a. A child has less resistance to learning if he can play an active role.

b. Learning is more efficient if the child himself can generate the underlying pattern or the underlying principles and concepts; this learning is retained longer.

c. Engaging as many senses as possible is extremely helpful.

d. The less a teacher has to depend upon words to convey knowledge, the better, especially in the earlier years.

e. Children differ markedly, from one child to another, and the same child at different times.

f. Inductive and deductive logic patterns should be embodied in instruction.

g. Variety for its own sake is invaluable.

h. All aspects of a concept ought to be imparted.

i. Reinforcement ought to be immediate. A teacher who cannot correct and return a paper the same day should not bother—the next day or even the next hour the child will have lost interest.

j. The child should actively discover or develop an underlying principle by himself, i. e. develop an insight as opposed to merely perceiving.

k. Each individual child will generally employ the learning technique most suited to him.

l. Each child should feel himself to be a person in his own right.

m. A child should learn to express himself without self-consciousness.

n. Generally, the meaning of a word or a concept is learned by trial an error, preferably in a variety of contexts.

o. Children learn best when they think they are learning.

p. Each child should be able to proceed at his own pace.

q. Deficiencies of below-average children are generally not in their ability to perceive and remember but in their ability to sort out what they perceive and remember.

The use of these principles and directions in the methods and devices of this invention have been demonstrated in experimental use under precisely controlled test conditions with a statistically valid number of children and attested to by knowledgeable people in the educational field.

Since filing of my original application on Jan. 2, 1968, I have also made improvements in the construction of the devices used, particularly with respect to providing expression means of such form that they interlock when mated to provide correct expressions while, when they are disposed adjacent to one another in a manner such as to provide incorrect expressions, they not only do not interlock but clearly indicate to the child that the expression is incorrect. In particular, when two expressions are correctly assembled and interlocked, they are disposed in alignment and with a minimum distance between centers thereof. When incorrect, they do not interlock and are either misaligned or have a substantially greater distance between the centers than in the mating condition.

The devices are also readily and inexpensively manufacturable as by die-cutting of cardboard, or plastic, the expressions being readily applied by printing, embossing or simiilar methods. This is important in that to obtain maximum benefit, a large number should be used and a great variety of subject matters should be provided.

This invention contemplates other objects, features and advantages which will become more fully apparent from the following detailed description taken in conjunction with the accompanying drawings:

BRIEF DESCRIPTION OF THE DRAWINGS:

FIG. 1 is a top plan view of an educational device constructed according to the principles of this invention;

FIG. 2 is a top plan view of the opposite side of the educational device of FIG. 1;

FIG. 3 is a top plan view of another embodiment of an educational device constructed according to the principles of this invention;

FIG. 4 is a top plan view of the opposite side of the educational device of FIG. 3;

FIG. 5 is a top plan view of still another embodiment of an educational device constructed according to the principles of this invention;

FIG. 6 is a top plan view of the opposite side of the educational device of FIG. 5;

FIG. 7 is a top plan view of an alternate construction of an educational device constructed according to the principles of this invention;

FIG. 8 is a side elevational view of the device of FIG. 7;

FIG. 9 is a top cut-away view of the device of FIG. 7;

FIG. 10 is a top plan view of another embodiment of an educational device according to the invention;

FIG. 11 is a plan view of a reverse side of the device of FIG. 10;

FIG. 12 is a perspective view of a small box for use with the device of FIGS. 10 and 11; and FIG. 13 is a perspective view of a large box for use with devices as shown in FIGS. 10 and 11.

Referring to FIGS. 1 and 2, reference numeral 10 generally designates an educational device constructed according to the principles of this invention and having component block members 11-15. Block members 11-15 may be constructed of paper, cardboard, plastic, wood or any other suitable material, and they may be of any color and size. Block members 11-15 have front flat faces 16-20 each with a portion of an expression printed thereon, and back flat faces 21-25 each with a portion of an expression printed thereon. The blocks 11-15 are shown here as generally rectangular in shape, but each block 11-15 has an irregular side 26-30 respectively having an irregularity 31-35 thereon. Irregularities 31 and 32 protrude from irregular sides 26 and 27, while irregularities 33-35 recede into irregular sides 28-30.

It can be seen from FIG. 1 that either of the irregular sides 26 and 27 of block members 11 and 12 may be mated with one of the irregular sides 28-30 of block members 13-15 to form a single, completed rectangle. When such a mating occurs, a complete and correct sentence is created on the rectangle with a singular subject and a singular verb. It can likewise be seen from FIG. 2, that either block member 11 or 12 may be mated with one of the block members 13-15 to form a complete rectangle having a completed and correct sentence thereon with a plural subject and a plural verb. It should be noted that it is impossible to properly combine one of the block members 11-15 in the position as shown in FIG. 1 with another of the block members 11-15 in the flipped over position as shown in FIG. 2.

In the illustrated arrangement, the irregularities 31 and 32 are in the form of projections from the right sides 26 and 27 of the blocks 11 and 12 while the irregularities 33, 34 and 35 are in the form of recesses in the left sides 28, 29 and 30 of the blocks 13, 14 and 15. Such irregularities are asymmetrical, the projections and recesses being offset from a line midway between opposite edges of the blocks. In the mating condition, the direction of offset is the same and the blocks can be assembled in aligned relation, with the opposite edges of the blocks along parallel lines, and in a relation such that there is a minimum distance between the geometric centers of the blocks. However, if the student attempts to assemble the blocks in an incorrect manner, for example if he attempts to place the block 13 as shown in FIG. 1 with the left side thereof against the right side of the block 11 as shown in FIG. 2, he will find it impossible to obtain alignment, with opposite edges of both blocks along parallel lines, and at the same time obtain a minimum distance between geometric centers of the blocks. This non-mating condition will be immediately apparent to the student.

Thus, it is impossible to construct an incorrect complete sentence by mating two of the block members 11-15. By mating block members to form rectangles, a young student creates complete and correct sentences. By observing his creation he begins to realize that certain words may be mated with other words and that certain other words may not be mated with other words. Although he is probably unfamiliar with the term "subject" and "verb", the student soon begins to reason inductively that sentences must be constructed in certain ways, and that the placement of the letter "s" on words is important to sentence construction. He will eventually reason how to combine the member parts by selecting block members according to the words printed thereon rather than the shape thereof. He thereby "discovers" proper sentence construction long before he is able to understand the concepts of subject, verb, and the relationship therebetween.

It should be noted that a young learner is allowed to use his tactile and visual senses in the learning process, and a minimum of oral instruction and understanding is necessitated. Thus, the educational device of this invention fosters active participation by a young student in the learning process and may be used to teach vary young or deprived students long before they are capable of really understanding oral or written instructions. The device does not require any understanding of color, and the words thereon could even be written in Braille for the benefit of blind children. Many more subject block members and verb block members may be incorporated into the device than the ones shown in FIGS. 1 and 2, and a large number of combinations may be formed by the student. The student may therefore use the same block members over and over again without simply reconstructing the same sentence or sentences. By placing sentence portions on both sides of the block members, an efficient use of the members is provided, and the student is stimulated to recognize relationships between the words thereon. By encouraging the student to observe his creations, to reason from his observations, and to discover through his reasoning, the device of this invention does more than simply impart factual knowledge to a young student.

Any number of geometrical constructions of this invention are possible, and they may be used to teach a large number of relationships and principles. Several different embodiments of this invention will now be described. It will be obvious from this description that embodiments may be devised having more than two members simultaneously combinable to form one geometrical shape and one or more than one complete expression. Embodiments may be devised wherein some members are wholly or partially surrounded by other members. It can be seen that even if some members of an embodiment of this invention become lost or broken, the embodiment is still functional and useful with less than all of its component members.

Referring to FIGS. 3 and 4, reference numeral 40 generally designates a device constructed according to the principles of this invention to instruct a student in the fundamentals of addition. This embodiment is particularly important because it demonstrates to a young student a very important fact, namely that addition may be conducted either vertically or horizontally with the same results in every case. Although this fact seems very simple, it is a concept which is often extremely difficult to convey to young students, especially those who are among the slower learners. Device 40 comprises block members 41–47 having upper faces 51–57 and opposite faces 61–67. Block members 41–43 have irregular sides 71–73, while block member 44 has irregular sides 74–76, and block members 45–47 have irregular sides 77–79. Irregular sides 71–73 of block members 41–43 may alternatively be mated with irregular side 74 of block member 44 to eliminate two irregular sides, while irregular sides 77–79 of block members 45–47 may be mated with irregular side 75 of block member 44 to eliminate two other irregular sides. In both instances the mating creates a completed and correct arithmetical expression. When the block members 41–47 are turned over as shown in FIG. 4, irregular sides 71–73 may still be mated with irregular side 74, and irregular sides 77–79 may now be mated with irregular side 76 to eliminate irregular sides and to create a different complete and correct arithmetical expression. As illustrated, sides 75 and 76 include recesses while sides 77–79 include mating projections. The device 40 operates in a manner similar to the device 10 to engage the tactile and visual senses of a young student in observing, reasoning, discovering and learning principles and relationships concerning addition. It should be obvious that different shapes and sizes of irregular faces on block members may be used with different numbers and combinations of numbers to teach the principles of addition, and that other arithmetical and mathematical principles may be taught in a similar manner.

FIGS. 5 and 6 show a completed rectangle 80 of an embodiment of this invention having component block members 81 and 82 with top faces 83 and 84 and opposite faces 85 and 86 and irregular sides 87 and 88 respectively. Irregular sides 87 and 88 are symmetrical about a line perpendicular to the center thereof, and it is therefore possible to combine either side 83 or 85 of block member 81 with either side 84 or 86 of block member 82. In this example any combination of the block members 81 and 82 creates a rectangular figure and a complete and correct sentence. It should again be understood that differently shaped blocks may be used, and that blocks having differently shaped irregular edges may be used, either above or in combination with the blocks of this embodiment, with different kinds of sentences and the appropriate kinds of punctuation marks thereon.

Referring now to FIGS. 7–9, which show a particular construction of a device of this invention, block members 91 and 92 having top faces 93 and 94 and sides 95 and 96 respectively are constructed of three relatively thin, flat layers of material 97–99 and 100–102 respectively, which may be integrally joined. The layers 97–102 are preferably of an opaque material. Outer layers 97, 99, 100 and 102 are rectangular in shape, while middle layers 98 and 101 have irregularities 103 and 104 in the edge thereof which forms a part of the irregular sides 95 and 96 respectively. It can be seen that the irregularity 104 on the edge 96 is invisible when the block member 92 is viewed from above as in FIG. 7. Thus, the block members 91 and 92 encourage a young student using them to rely on the portions of an expression thereon rather than the geometrical shape thereof in mating the two block portions. It is understood that there could be numerous block members and combinations of members formed in a manner similar to block members 91 and 92. Block members so constructed could be of special advantage with students who have previously been exposed to block members constructed as in FIGS. 1 and 2, and who have already gained some awareness of proper sentence construction. In other words, block members constructed as in FIGS. 7–9 could be used as a second stage in a student's learning process, which could function as a combination self-testing and self-teaching stage.

Referring now to FIGS. 10 and 11, reference numeral 110 generally designates a set of expression means constructed in accordance with the principles of this invention, comprising 20 pieces 111–130 which can be assembled in a multiplicity of different ways to express a multiplicity of different sentences.

As illustrated, pieces 111 and 112 express plural subjects and the right side of each of the pieces 111 and 112 is arranged to mate with the left side of either of the pieces 115 and 116 which express plural verbs. Pieces 113 and 114 express singular subjects and the right sides thereof are arranged to mate with the left sides of pieces 117 and 118 which express singular verbs. The right side of each of the pieces 115–118 is arranged to mate with the left side of each of the pieces 119–122 which express adjective forms and the right side of each of the pieces 119–122 is arranged to mate with the left side of each of the pieces 123–126, each of which expresses a noun or object, and the right side of each of the pieces 123–126 is arranged to mate with the left side of each of the pieces 127–130, each of which has a period thereon. The pieces are arranged to mate in a manner such as to set forth a complete sentence which is grammatically correct. Thus, the right sides of pieces 111 and 112 mate only with the left sides of pieces 115 and 116 and will not mate with the left sides of pieces 117–130. The right sides of pieces 113 and 114 mate only with the left sides of pieces 117 and 118 and will not mate with the left sides of pieces 115, 116 and 119–130. Similarly, the right sides of the pieces 115–118 mate only with the left sides of the pieces 119–122, the right sides of the pieces 119–122 mate only with the left sides of the pieces 123–126 and the right sides of the pieces 123–126 mate only with the left sides of the pieces 127–130.

The mating relationships are obtained with an interlocking feature such that mated pieces will not pull apart when they are lying on a flat supporting surface. As shown, the right side of the piece 111 is provided with a projection 131 which fits in a recess 132 in the left side of the piece 115. The pieces 112 and 116 are provided with projections and recesses identical to those of the pieces 111 and 115. The piece 113 is provided with a projection 133 which fits into a recess 134 in the left side of the piece 117 and pieces 114 and 118 are respectively provided with a projection and a recess identical to the projection 133 and recess 134. As shown, the projection 131 has a straight outer edge parallel to the right side of the piece 111 and has straight sides, converging, a relatively wide width at the outer end to a narrow width at the inner end where the projection 131 adjoins the right side of the piece 111. The projection 133 is rounded, having a neck portion where it adjoins the piece 113 which is substantially narrower than the width at the widest point, so as to obtain the interlocking engagement. Preferably, the width of the projection 131 at the point where it adjoins the right side of the piece 111 is less than the width of the projection 133 at the point where it adjoins the right side of the piece 113 and the length of the projection 131 is less than that of the projection 133 while the width of the projection 131 at the point of maximum width thereof is greater than the width of the projection 133 at the maximum point thereof. With this arrangement, it is not possible to fit the right side of piece 117 on the left side of the piece 111 with the pieces in alignment and with a minimum distance between geometric centers thereof, nor is it possible to fit the piece 115 on the piece 113 in alignment and with a minimum distance between geometric centers thereof. Also, of course, the pieces do not interlock when incorrectly assembled. At the same time, the projections 131 and 133 and corresponding recesses 132 and 134 are symmetrically located with respect to a line midway between opposite edge portions of the pieces, and it is thus possible to turn the pieces over and obtain the same mating relationship, so that if, as illustrated, a plural subject and a plural verb are provided on faces of the pieces 111 and 115, different plural subjects and verbs may be provided on the opposite faces thereof.

The right side of the piece 115 is provided with a pair of projections 135 and 136 adapted to mate and interlock with a pair of recesses 137 and 138 in the piece 119, each of the projections 135 and 136 being generally rounded with a narrow neck portion. The right side of the piece 119 is provided with a similar pair of projections 139 and 140 adapted to mate with recesses 141 and 142 in the left side of the piece 132. Projections 139 and 140 are, however, spaced a greater distance apart than the projections 135 and 136 so that the left side of the piece 123 will not mate with the right side of the piece 115. The right side of the piece 123 is provided with three projections 143, 144 and 145 adapted to mate with three recesses 146, 147 and 148, each of the projections 143-145 having a narrow neck portion, to obtain an interlocking engagement.

The right sides of the pieces 116-118 are identical to the right side of the piece 115, the pieces 120-122 are identical in shape to the piece 119, the pieces 124-126 are identical in shape to the piece 123 and the pieces 128-130 are identical in shape to the piece 127. It is noted that the projections and recesses in all pieces are symmetrically located with respect to a line midway between parallel lines along which the opposite edges of the pieces extend when the pieces are interlocked to form a sentence. Thus, each of the pieces may be provided with a similar but different expression on the reverse face thereof.

As illustrated in FIG. 10, pieces 111, 115, 119, 123, and 127 are respectively provided with the expressions "Some boys", "want", "the large", "picture" and a period (.) thereon so that when assembled and interlocked, they form the complete and grammatically correct sentence, "Some boys want the large picture". Similarly, pieces 112, 116, 120, 124 and 128 form a second sentence "Four brothers pull the middle scarf."; pieces 113, 117, 121, 125 and 129 form a third sentence: "One brother wants the blue table."; and pieces 114, 118, 122, 126 and 130 form a fourth sentence: "A girl wins the cheap string." As illustrated in FIG. 11, all of the pieces 111-130 can be turned over to express four additional sentences: "Many girls like the ugly kite."; "Two men hate the expensive basket."; "My sister likes the big toys."; and "Mother pushes the beautiful ribbon." As hereinafter discussed, the fact that some grammatically correct expressions may be amusing to children is a distinct asset. Thus FIGS. 10 and 11 illustrate combinations which can be made to form eight complete grammatically correct sentences, but the pieces can be combined in a great many different ways, each of which expresses a complete grammatically correct sentence. With 20 pieces as illustated, 2048 complete grammatically correct sentences are possible.

In accordance with the invention, a 20-piece set such as illustrated in FIGS. 10 and 11 may be supplied to a child in disassembled form, as in a small box 150 having a cover 151 as illustrated in FIG. 12. The child is allowed to assemble pieces on his own without pre-instruction and will generally construct four complete sentences such as illustrated. In some cases, the child will experiment as by rearranging formed complete sentences to place plural subject sentences together or to place singular and plural subject sentences alternately. In my experience, he will never spontaneously or of his own accord disassemble a formed complete correct sentence. After a time a much larger number of sets are supplied to the child, as by giving the child access to a large box 152 having a cover 153, illustrated in FIG. 13. The box 152 may for example, contain 10 sets identical to the set 110 illustrated in FIGS. 10 and 11 from which the child might construct 40 different sentences at the same time, in addition to the four sentences possible to construct at the same time with the set initially supplied. The box 133 may, however, include many more sets, especially if used by a number of students as in a classroom.

The supply of a large numer of pieces to the child is extremely important in that through the repeated process of finding and assembling the pieces, the child learns the process much more thoroughly and also, with respect to a particular subject such as sentence structure, he learns the underlying pattern and underlying principles of the sentence structure by himself, developing his own insight. The child continues until he learns and he has reassured himself that he has learned.

Initially, a very large number of pieces might be supplied to the child; but, in general, it is highly desirable to supply a relatively small set as described, in order that the child will not be overwhelmed at the outset. However, once the child has had experience with the process, a quite large number of pieces can be supplied to him. For example, once the child has become experienced to the process as applied to sentence structure, he can be then supplied with large numbers of pieces such as illustrated in FIGS. 3 and 4, for learning the application of the discovery and inductive reasoning process as applied to mathematics.

The set 110 illustrated in FIGS. 10 and 11 provides a very large variety in sentences which can be constructed, which is very important in maintaining the interest of the child. It is also noted that some of the sentences formed are nonsensical at least to some degree such as "Mother pushes the beautiful ribbon."This feature is not undesirable but, on the contrary, it is highly desirable in amusing the child and maintaining his level of interest. When a child shows amusement, it is an indicator that he has proceeded beyond the introductory, development and insight stages of learning and is going into the overlearning stage. It is a signal to the teacher that the child is ready for other activities. A great many different types of subject matters can be set forth in the expression means and it is highly desirable to expose the child to a variety of subject matters in order that he may gain a very thorough understanding of the discovery and inductive reasoning process, on his own, and recognize the universal applicability thereof. The type of subject matter must, of course, be related to the prior knowledge and experience of the student. Thus, the set 110 as illustrated would not be appropriate for a child just beginning to read and having knowledge of only a few of the words. It is not necessary that the child know all of the words, but only a majority and most children will learn vocabulary while using the system. In the case of a child knowing only a few words, however, more simple words and sentence structurs might be used, as shown in FIGS. 1 and 2. For a child unable to read at all, pictures or drawings may be used.

The invention is particularly important as applied to the education of young children. However, the invention is not limited to simple subjects and can be applied to relatively complex subjects such as algebra and higher mathematics and computer progamming. It can be readily applied to any subject in which the classification of species of a genus is involved. Once the student has learned by himself how to apply the discovery and inductive reasoning process, the impartation of higher levels of learning are much more readily accomplished It is noted that the blocks or pieces in each of the illustrated embodiments may preferably be formed readily and inexpensively as by die-cutting stiff cardboard, or plastic, with the expresions being imprinted, or embossed thereon. Blank blocks or pieces may also be supplied to which any desired expressions may be applied by the teacher or by the students themselves after they have grasped the concepts. The blocks or pieces are preferably small enough to permit the student to readily form a number of complete expressions simultaneously on the top of a school desk or the like while being large enough to permit ready manipulation by the child and easy viewing of the expressions. By way of example, the pieces in the embodiment of FIG. 10 and 11 may be of such length that a set of five thereof, forming a complete sentence, is about 13½ inches long with a width of about 1⅜ inches. The thickness of the cardboard may be on the order of 1/16th inch.

The number of pieces and the number of possible complete correct expressions necessary to obtain positive results in teaching the discovery and inductive reasoning process varies according to the prior experience and intelligence of the student. It is found that excellent results are obtained using an introductory set of twenty pieces as illustrated in FIGS. 10 and 11 with which four complete, simultaneously visible expressions can be formed. With this set 2048 combinations are possible which is much more than necessary for an introductory set. The number of different combinations possible should be at least on the order of 25 in order for the student to begin to learn the process from his own experimentation with the set.

It is important that the majority of possible mismates be such that their not belonging together be perceivable by the child without an explanation or demonstration by the teacher as to what constitutes a correct mating. Mere appearance of open spaces at the mating point usually is not sufficient for a given child unless the majority of pieces present stronger non-interlocking state. In such an instance, the child who has initially misassembled a couple of pieces will spontaneously, after having assembled other pieces correctly, come back and reassemble the misfits. Thus, in effect, even with a design defect—so long as it comprises the minority of pieces—the system actually directly teaches the child how to use the system itself and how to overcome a defect.

A small introductory set is valuable by itself, but it is highly desirable and important that a student be given access to a much larger number of pieces, either after experimentation with an introductory set or initially and the larger set should make it possible to form at least eight simultaneously visible complete expressions, with at least 100 correct examples being possible.

It will be understood that modification and variations may be effected without departing from the spirit and scope of the novel concepts of this invention.

I claim as my invention:

1. In an educational system for facilitating the learning through discovery and inductive reasoning provess a plurality of sets of expression means for enabling a student to learn a plurality of applications of the discovery and inductive reasoning process as applied to the learning of a plurality of sets of interrelated concepts, the respective subject matters of said plurality of sets of interrelated concepts being substantially different and being such that a student learns that the discovery and inductive reasoning process is applicable to a variety of fields of interest from learning of its application to said plurality of subject matters, said expression means of each of said sets having a multiplicity of expressions thereof divided into first and second groups and being physically manipulatable to dispose any expression of said first group into adjacent relation to any expression of said second group, each expression of said first group being combinable with a plurality of expressions of said second group to form a plurality of different correct examples of similar expressions and to establish for the corresponding set of interrelated concepts a plurality of different correct examples of combinations of expressions and a plurality of incorrect examples of combinations of expressions,, interengagement means on said expression means of each of said sets having physical configurations and interchangability such that a physically non-mating relationship exists when each incorrect example is established and such that a physically mating relationship exists when each correct example is established so as to reward the student and so as to increase his confidence as each new correct example is established, said multiplicity of expressions on said expression means of each of said sets and the numbers of said correct and incorrect examples being sufficient to enable the student to learn said interrelated concepts solely from the discovery and inductive reasoning process during trial and error manipulation of said expression means and to facilitate learning through the discovery and inductive reasoning process itself irrespective of the subject matter of said one set of interrelated concepts, each of said sets of expression means being such as to provide at least on the order of 100 different possible complete and correct examples and being such that at least eight simultaneously visible different correct examples can be formed, said expression means including mating projection and recess means so constructed and arranged that both the existence and non-existence of said physical mating relation is readily determined tactilely without visual observation.

2. In a system as defined in claim 1, said expression means being of generally rectangular form with a pair of said expression means being disposable in aligned relation with opposite edge portions thereof along parallel lines, said interengagement means including projection means on one side of said pair of expression means and recess means on the adjacent sides of the other of said expression means, said projection and recess means being located in spaced relation from and intermediate said opposite edge portions and being such that said pair of expression means are disposable in said aligned relation with said opposite edge portions along said parallel lines and with a minimum distance between centers thereof only when said physical mating relation exists and being such as to prevent relative slidable movement in a direction transverse to said opposite edge portions when said physical mating relation exists, whereby the existence and non-existence of said physical mating relation is readily determinable tactilely without visual observation.

3. In a system as defind in claim 2, said projections and recesses being offset from a line midway between said opposite edge portions, and said pair of expression means being mated when the directions of said offsets are the same and being non-mated when the directions of said offsets are opposite.

4. In a system as defined in claim 1, said interengagement means being such that a pair of expression means are interlocked when said physically mating relationship exists.

5. In a system as defined in claim 1, said interenegagement means including a plurality of forms each operative for establishing a mating relationship.

6. In a system as defined in claim 5, one of said forms including a projection and a mating recess, another of said forms including a projection and a mating recess, each of said projections having a narrow neck portion with the width of said neck portion of said projections of one of said forms being narrower than the neck portion of said projection of said another of said forms, and said projection of said one of said forms having a maximum width greater than the maximum width of said projection of said another of said forms.

7. In a system as defined in claim 5, one of said forms including a pair of projections and mating recesses, and another of said forms including a pair of projections and mating recesses spaced apart a distance different from the spacing of said pair of projections of said one of said forms.

8. In a system as defined in claim 7, an additional one of said forms including three projections and mating recesses.

9. In a system as define in claim 1, one of said sets of interrelated concepts being that algebraic combinations of numbers can be performed horizontally and another of said set of sets of interrelated concepts being that algebraic combinations of numbers can be performed vertically, said set of expression means comprising nubmers combinable in horizontal relation to form a plurality of correct examples of said one of said concepts and members combinable vertically to form a plurality of correct examples of said another of said concepts.

10. In a system as defined in claim 1, said expression means including opaque shielding portions arranged to obscure said mating projection and recess means from view.

* * * * *